United States Patent
Hosseini et al.

(10) Patent No.: US 10,405,305 B2
(45) Date of Patent: Sep. 3, 2019

(54) SINGLE SLOT SHORT PUCCH WITH SUPPORT FOR INTRA SLOT FREQUENCY HOPPING

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/892,054

(22) Filed: Feb. 8, 2018

(65) Prior Publication Data

US 2018/0279296 A1    Sep. 27, 2018

Related U.S. Application Data

(60) Provisional application No. 62/476,653, filed on Mar. 24, 2017.

(51) Int. Cl.
    *H04W 72/04* (2009.01)
    *H04L 5/00* (2006.01)

(52) U.S. Cl.
    CPC ......... *H04W 72/0413* (2013.01); *H04L 5/001* (2013.01); *H04L 5/0048* (2013.01); *H04L 5/0053* (2013.01); *H04W 72/0446* (2013.01)

(58) Field of Classification Search
    CPC ................ H04W 72/0413; H04W 72/0446
    See application file for complete search history.

(56) References Cited

U.S. PATENT DOCUMENTS 9,762,357 B2   9/2017  Määttanen et al.
2013/0294353 A1*  11/2013  Han ................... H04L 5/001
                                                         370/329

(Continued)

FOREIGN PATENT DOCUMENTS

WO    2017166195 A1    10/2017

OTHER PUBLICATIONS

Ericsson: "On UL sTTI Layout," 3GPP Draft; R1-1703256 on UL STTI Layout, 3rd Generation Partnership Project (3GPP), Mobile Competence Centre; 650, Route Des Lucioles; F-06921 Sophia-Antipolis Cedex; vol. RAN WG1, No. Athens, Greece; Feb. 13, 2017-Feb. 17, 2017, Feb. 12, 2017 (Feb. 12, 2017), XP051210386, 8 pages, Retrieved from the Internet:URL:http://www.3gpp.org/ftp/Meetings_3GPP_SYNC/RAN1/Docs/ [retrieved on Feb. 12, 2017].

(Continued)

*Primary Examiner* — Luat Phung

(74) *Attorney, Agent, or Firm* — Arent Fox, LLP

(57) ABSTRACT

Various features related to design and implementation of a single slot sPUCCH are described. In an aspect, the single slot sPUCCH supports intra-sTTI frequency hopping. In some configurations where intra slot frequency hopping is supported, one or two hops per slot may be utilized. An apparatus, e.g., a UE, may be configured to transmit first UCI in a first set of resources within a first set of symbols of a sPUCCH within a slot, and transmit second UCI in a second set of resources within a second set of symbols of the sPUCCH within the slot, where the second set of symbols may be subsequent to the first set of symbols. In some configurations, a number of symbols in each of the first and second sets of symbols maybe based on whether the slot is a first slot of a subframe or a second slot of the subframe.

29 Claims, 11 Drawing Sheets

(56) References Cited

U.S. PATENT DOCUMENTS

| | | | |
|---|---|---|---|
| 2014/0056188 A1* | 2/2014 | Yang | H04L 5/0053 370/280 |
| 2014/0092792 A1* | 4/2014 | Kim | H04L 5/0007 370/280 |
| 2015/0358964 A1 | 12/2015 | Tiirola et al. | |
| 2016/0056934 A1 | 2/2016 | Li et al. | |
| 2017/0215206 A1* | 7/2017 | Cheng | H04W 74/0816 |
| 2018/0167932 A1* | 6/2018 | Papasakellariou | H04L 5/0055 |
| 2018/0167933 A1* | 6/2018 | Yin | H04W 72/0413 |
| 2018/0176909 A1* | 6/2018 | Wikstrom | H04W 72/0446 |
| 2018/0192417 A1* | 7/2018 | Yin | H04W 72/0413 |

OTHER PUBLICATIONS

International Search Report and Written Opinion—PCT/US2018/017604—ISA/EPO—dated Apr. 26, 2018.
NTT DOCOMO: "Views on sPUCCH Design," 3GPP Draft; R1-1702784, 3rd Generation Partnership Project (3GPP), Mobile Competence Centre; 650, Route Des Lucioles; F-06921 Sophia-Antipolis Cedex; vol. RAN WG1, No. Athens, Greece; Feb. 13, 2017-Feb. 17, 2017, Feb. 12, 2017 (Feb. 12, 2017), XP051209931, pp. 1-7, Retrieved from the Internet:URL:http://www.3gpp.org/ftp/Meetings_3GPP_SYNC/RAN1/Docs/ [retrieved on Feb. 12, 2017].
QUALCOMM Incorporated: "Uplink Control Channel Design for Shortened TTI," 3GPP draft; r1-1611639 uplink control channel design for shortened tti, 3rd generation partnership project (3gpp), mobile competence centre; 650, route des lucioles; F-06921 Sophia-Antipolis Cedex; vol. RAN WG1, No. Reno, USA; Nov. 14, 2016-Nov. 18, 2016, Nov. 13, 2016 (Nov. 13, 2016), XP051175612, pp. 1-9, Retrieved from the Internet: URL:http://www.3gpp.org/ftp/Meetings_3GPP_SYNC/RAN1/Docs/ [retrieved on Nov. 13, 2016].

* cited by examiner

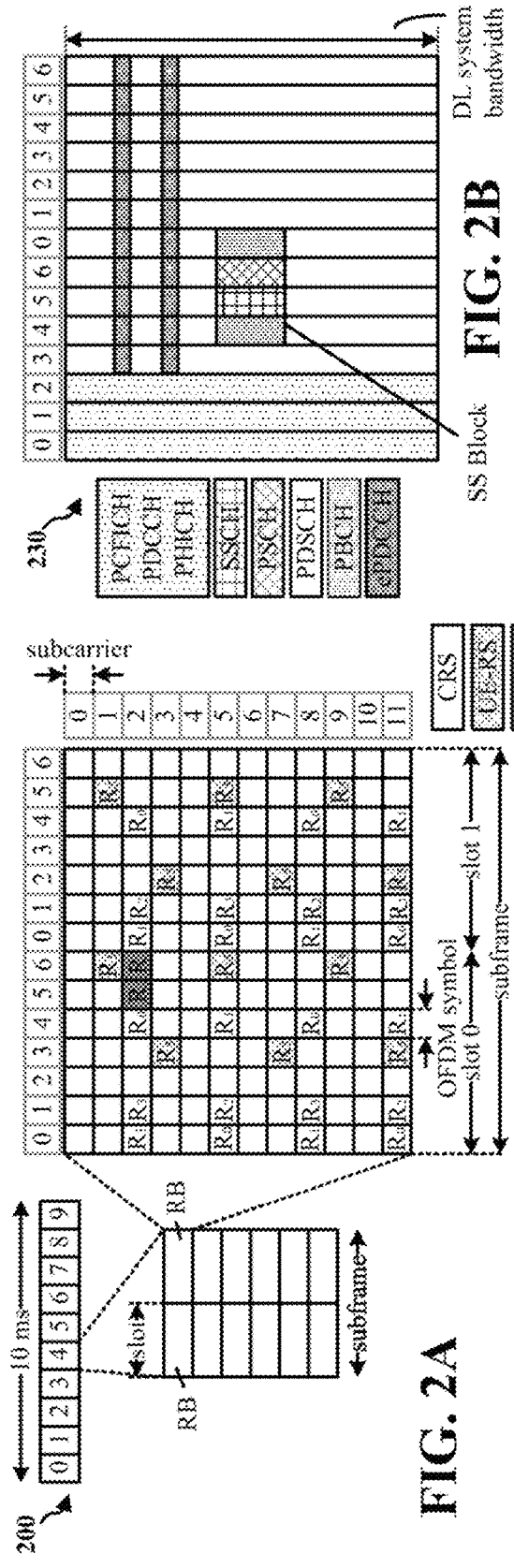
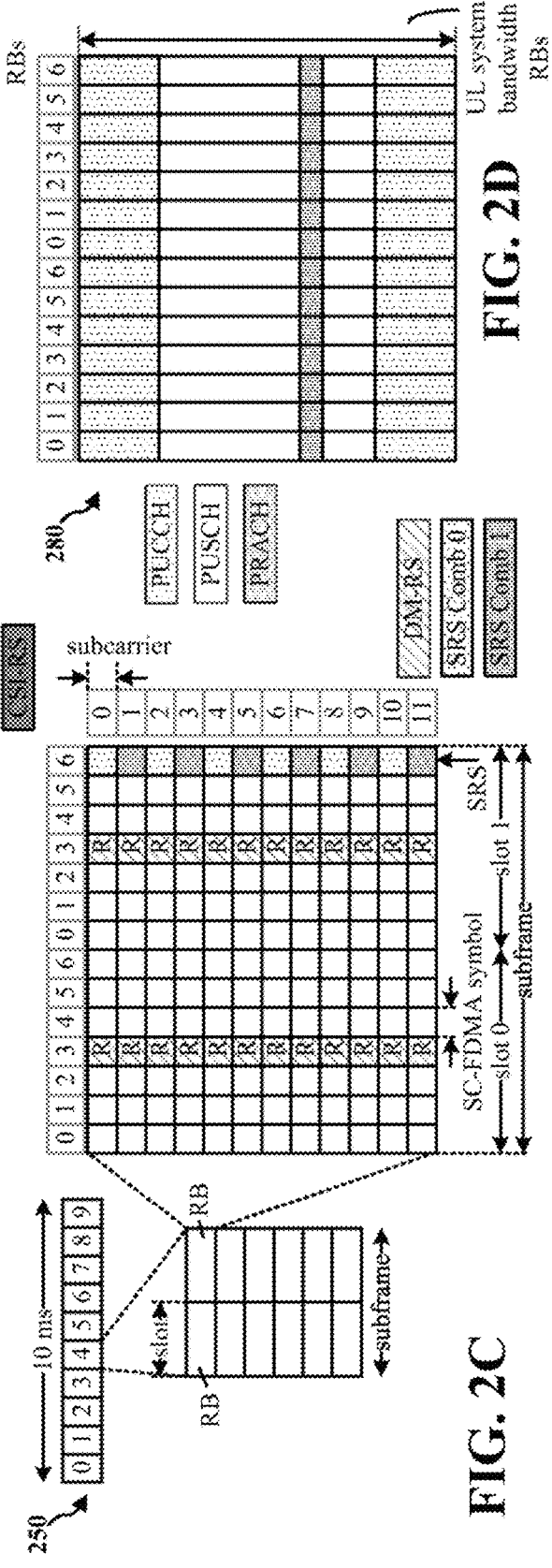
FIG. 2A
FIG. 2B
FIG. 2C
FIG. 2D

SINGLE SLOT SHORT PUCCH WITH SUPPORT FOR INTRA SLOT FREQUENCY HOPPING

CROSS-REFERENCE TO RELATED APPLICATION

This application claims the benefit of and priority to U.S. Provisional Application Ser. No. 62/476,653 entitled "SINGLE SLOT SHORT PUCCH WITH SUPPORT FOR INTRA SLOT FREQUENCY HOPPING" filed on Mar. 24, 2017, which is expressly incorporated by reference herein in its entirety as if fully set forth below in its entirety and for all applicable purposes.

TECHNICAL FIELD

The technology discussed below relates generally to communication systems, and more particularly, to design and implementation of a shortened physical uplink control channel (sPUCCH) that supports use of intra slot frequency hopping. Certain embodiments enable and provide improved communication techniques that can yield lower latency communication scenarios with high reliability.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLE ASPECTS

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In one aspect, an exemplary apparatus, e.g., a user equipment (UE), may include a memory and at least one processor coupled to the memory. In such an aspect, the at least processor may be configured to transmit first uplink control information (UCI) in a first set of resources within a first set of symbols of a shortened physical uplink control channel (sPUCCH) within a slot. The at least one processor may be further configured to transmit second UCI in a second set of resources within a second set of symbols of the sPUCCH within the slot, where the second set of symbols may be subsequent to the first set of symbols. In some configurations, a number of symbols in each of the first and second sets of symbols within the slot may be based on a slot index of the given slot within a subframe. For example, in an aspect a number of symbols in the first set of symbols and a number of symbols in the second set of symbols is based on whether the slot is a first slot (slot 0) of a subframe or a second slot (slot 1) of the subframe. In some configurations, the sPUCCH may have a first structure that is different from a second structure of a second sPUCCH with respect to at least one of a number of resource blocks, a number of demodulation reference signals (DM-RS), positions for the DM-RS, comb structure, or orthogonal cover code (OCC) length.

In one aspect, an example method of wireless communication of a UE comprises: transmitting first UCI in a first set of resources within a first set of symbols of a sPUCCH within a slot, and transmitting second UCI in a second set of resources within a second set of symbols of the sPUCCH within the slot, where the second set of symbols may be subsequent to the first set of symbols. In one such aspect, a number of symbols in the first set of symbols and a number of symbols in the second set of symbols is based on whether the slot is a first slot of a subframe or a second slot of the subframe.

In one aspect, an exemplary apparatus (e.g., a UE) may comprise: means for storing, and means for transmitting first UCI in a first set of resources within a first set of symbols of a sPUCCH within a slot. The means for transmitting may be further configured to transmit second UCI in a second set of resources within a second set of symbols of the sPUCCH within the slot, where the second set of symbols may be subsequent to the first set of symbols. In one such aspect, a number of symbols in the first set of symbols and a number of symbols in the second set of symbols is based on whether the slot is a first slot of a subframe or a second slot of the subframe.

In an aspect, a computer-readable medium is provided. The computer-readable medium may store computer executable code, comprising code to: transmit first UCI in a first set of resources within a first set of symbols of a sPUCCH within a slot, and transmit second UCI in a second set of resources within a second set of symbols of the sPUCCH within the slot. The second set of symbols may be subsequent to the first set of symbols. In one such aspect, a number of symbols in the first set of symbols and a number of symbols in the second set of symbols is based on whether the slot is a first slot of a subframe or a second slot of the subframe.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
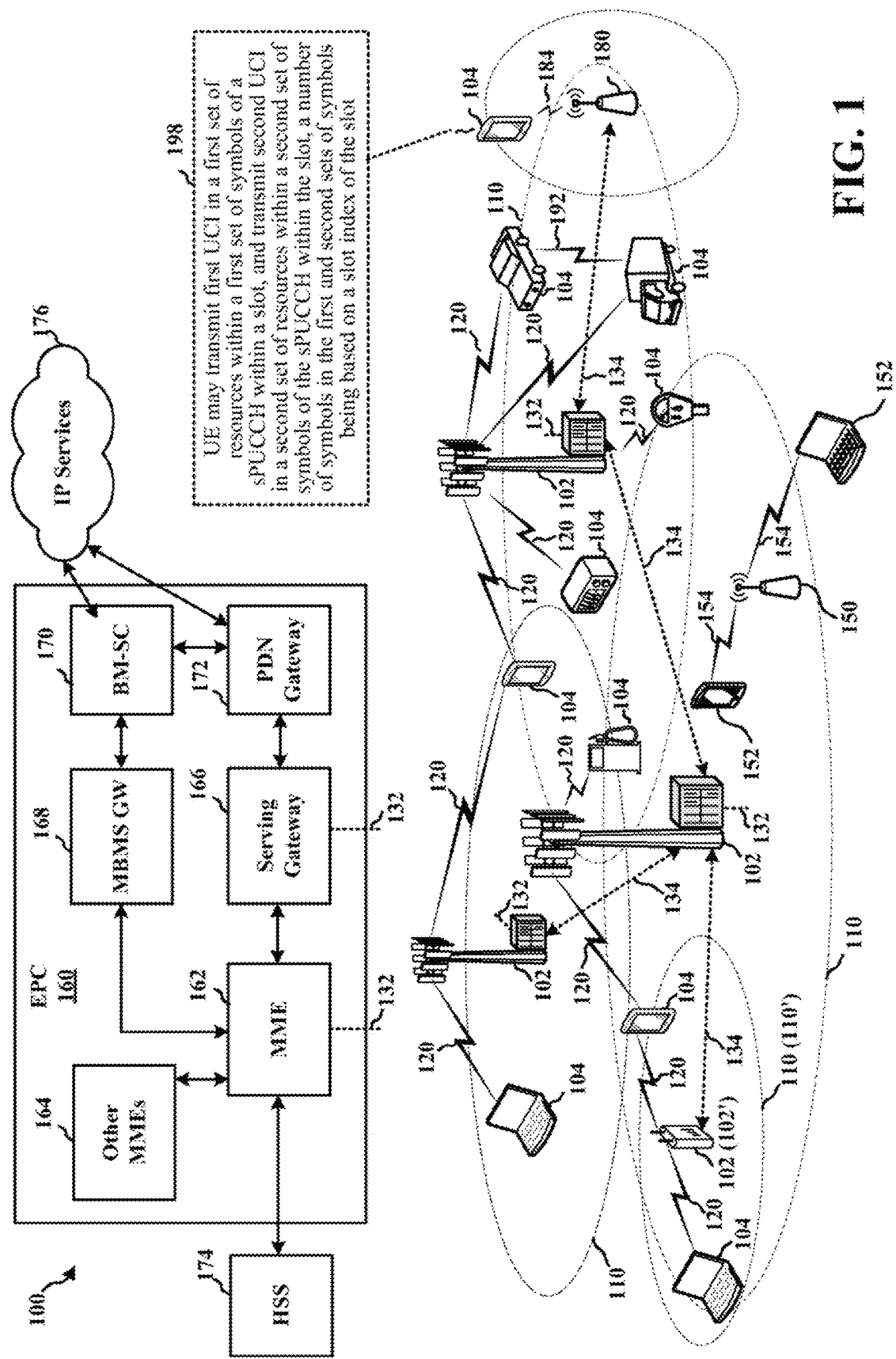
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an entertainment device, a medical device, industrial operating equipment, vehicles or vehicular modules, automobiles, an electric meter, a gas pump, a toaster, or many other devices that can be configured with wireless communication abilities. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit first UCI in a first set of resources within a first set of symbols of a sPUCCH within a slot, and transmit second UCI in a second set of resources within a second set of symbols of the sPUCCH within the slot (198). In one aspect, the second set of symbols is subsequent to the first set of symbols. In one aspect, a number of symbols in the first set of symbols and a number of symbols in the second set of symbols is based on a slot index of the slot, e.g., whether the slot is a first slot of a subframe or a second slot of the subframe (198). In an aspect, the sPUCCH may have a first structure that is different from a second structure of a second sPUCCH in a different slot. The first and second structures may be different with respect to at least one of a number of resource blocks, a number of DM-RS, positions for the DM-RS, comb structure, or OCC length. Various additional aspects and features are discussed infra with respect to FIGS. 4-9 in greater detail.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
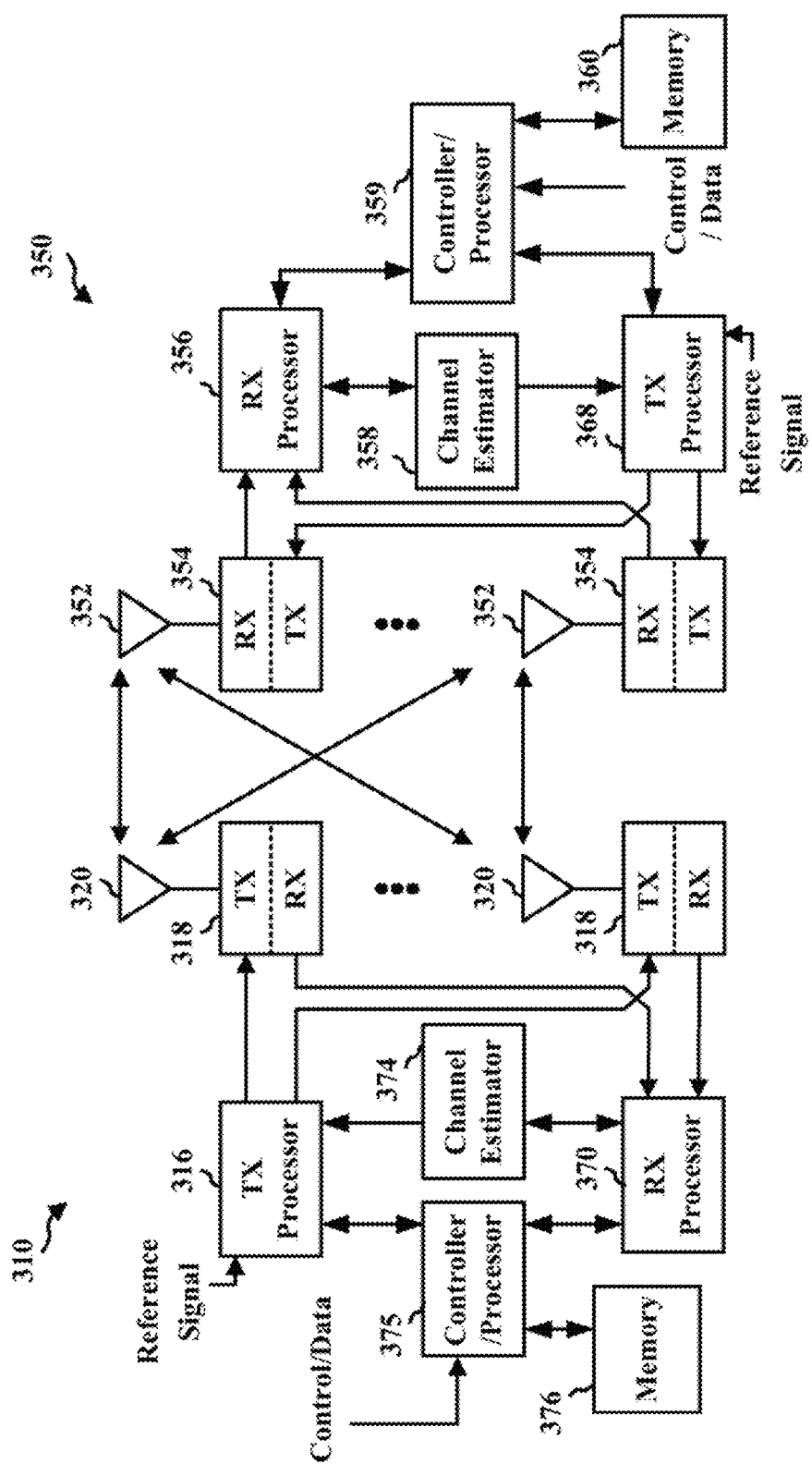
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

There has been an increased interest in improving short transmission time interval (sTTI) operations in LTE and NR systems. Some such improvements may include new and improved design and implementation of a sPUCCH. The new design may allow intra-sTTI frequency hopping support in a slot-based shortened PUCCH (sPUCCH). For example, for a sPUCCH, e.g., where the sPUCCH may occupy a slot of a subframe or a portion thereof, frequency hopping within the sTTI, e.g., which in some cases may correspond to a slot of the subframe, may be allowed in some configurations. In some configurations, one hop per slot may be used. In some other configurations, two hops per slot may be used. However in various configurations, at least one other slot-based sPUCCH format may also be supported without intra-sTTI frequency hopping. Furthermore, in some configurations, dynamic switching between intra-sTTI frequency hopping and no intra-sTTI frequency hopping for the same slot-based sPUCCH format may not be allowed. In an aspect, the same slot-based sPUCCH format may support both intra-sTTI frequency hopping and no intra-sTTI frequency hopping.

Various features related to design and implementation of a sPUCCH are described. In an aspect, a single slot sPUCCH format with intra-sTTI frequency hopping is supported. In some configurations, intra slot frequency hopping is supported and one hop per slot may be utilized, while in some other configurations two hops per slot may be utilized. An aspect that is taken into consideration in some configurations where intra-sTTI hopping is adopted, is the coexistence, e.g., compatibility or conformance, with a 2-symbol sPUCCH. For example, the uplink layout for a 2-symbol sTTI is, e.g., [3,2,2,2,2,3]. That is, in a subframe, the first and the last parts of the PUCCH may each include 3 symbols (e.g., SC-FDM symbols or OFDM symbols), while other part(s) of the PUCCH may each include 2 SC-FDM symbols or multiples of 2 SC-FMD symbols, e.g., 2 or 4 SC-FDM symbols. When adopting intra-sTTI hopping, it is useful to configure the frequency hopping pattern within a slot in accordance with the above layout. Some of the advantages of using such a 2-symbol sTTI layout include improved multiplexing and more efficient use of the symbols within the slot. In accordance with one aspect, a plurality of different frequency hopping patterns may be considered with a single slot sPUCCH. In one aspect, a single hop per slot of a subframe is used. In another aspect, two hops per slot of the subframe may be utilized as illustrated with regard to FIGS. 4 and 5.

Figure 4:
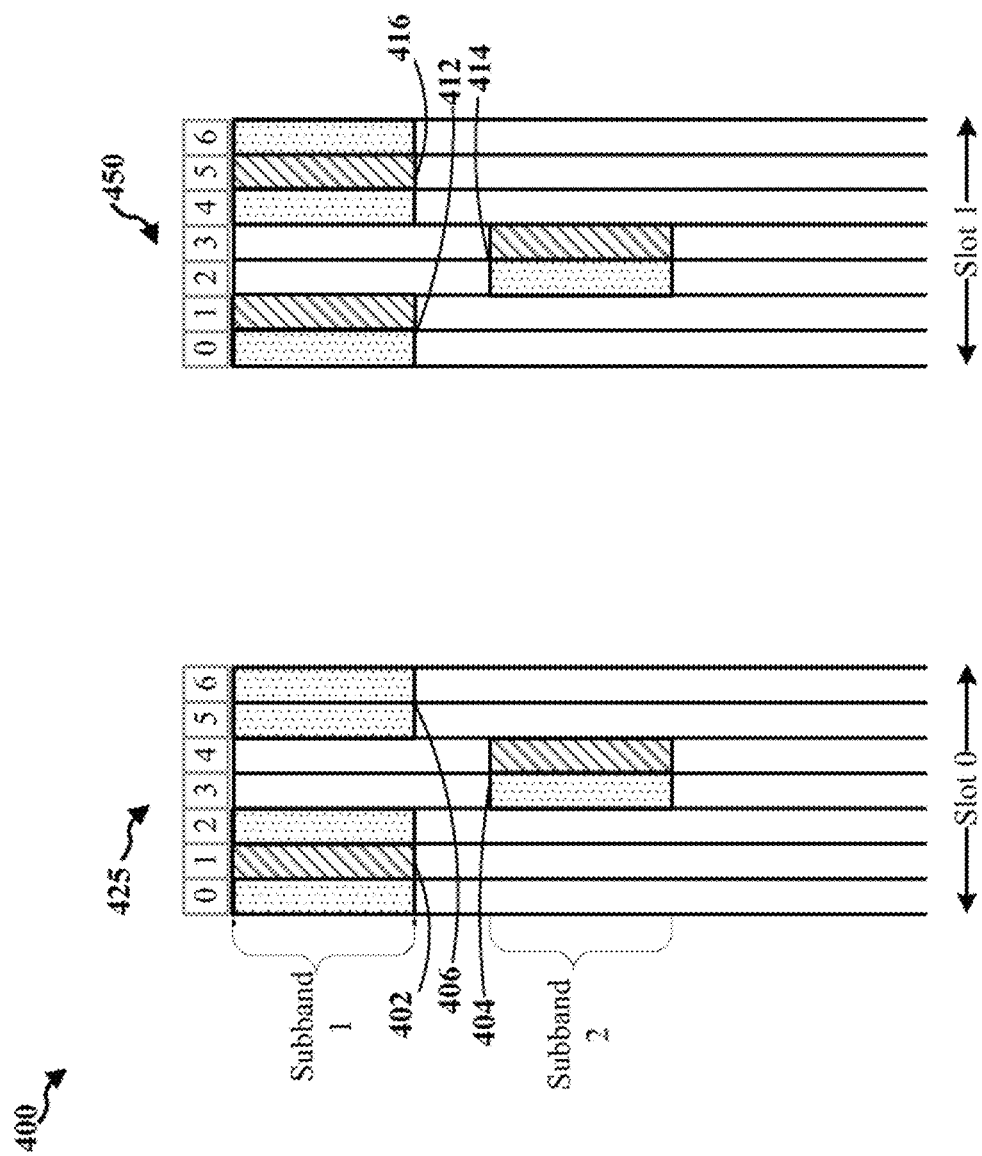
FIG. 4 illustrates two configurations of a single slot sPUCCH and a first intra-short transmission time interval (sTTI) frequency hopping pattern used therewith.

FIG. 4 is a drawing 400 illustrating two configurations of a single slot sPUCCH and an intra-sTTI frequency hopping pattern used therewith. The frequency (bandwidth) is plotted in the vertical direction (along Y-axis) and the horizontal direction (X-axis) represents time. Drawing 400 shows a first configuration 425 of the single slot sPUCCH when the sPUCCH is in a first slot (slot 0) of a subframe and a second configuration 450 of the single slot sPUCCH when the sPUCCH is in a second slot (slot 1) of the subframe. As may be appreciated, depending on the slot index within the subframe, the configuration/layout of an sPUCCH may be different. In the illustrated example, a frequency hopping pattern with 2 hops per slot is used. As discussed above, in accordance with an aspect the frequency pattern shown in drawing 400 may be configured in accordance with uplink layout of the 2-symbol sTTI which may be expressed as [3,2,2,2,2,3]. That is, when the sPUCCH is in the first slot of a subframe, the sPUCCH may be configured in a form of 3+2+2 symbols as illustrated in the configuration 425, while the sPUCCH may be configured in the form of 2+2+3 symbols when the sPUCCH is in the second slot of the subframe as illustrated in the configuration 450. When 2 hops per slot are allowed, in one configuration, the first and the third parts (sets of symbols) of the sPUCCH may occupy a first subband, while the middle part occupy a different subband of the frequency bandwidth. As illustrated, with the 2 hop per slot hopping pattern in the sPUCCH configuration 425 (e.g., sPUCCH in first slot (slot 0) of subframe), the first set of 3 symbols (402) corresponding to the sPUCCH are associated with a first frequency subband (subband 1), the next set of 2 symbols (404) corresponding to the sPUCCH are associated with a second frequency subband (subband 2), and the last 2 symbols (406) of the sPUCCH are again in the first frequency subband. In the first sPUCCH configuration 425, the resources (e.g., resource elements/subcarriers) corresponding to the first and third symbols of the set of symbols 402 in subband 1, may carry uplink control data, e.g., first UCI (shown with a dotted pattern) while the resources (e.g., subcarriers corresponding to subband 1) in the second symbol of the set of symbols 402 may carry DM-RS (diagonal line pattern), e.g., for channel estimation at the base station. The resources corresponding to the first symbol of the set of 2 symbols 404 corresponding to subband 2, may carry uplink control data (e.g., second UCI) while the resources of the second symbol of the set of symbols 404 may carry DM-RS. The resources corresponding to the first and second symbols of the set of 2 symbols 406 in subband 1 may carry uplink control data (e.g., third UCI). However, in some other configurations, one of the symbols in the set of symbols 406 may be a DM-RS symbol (optional). In accordance with one aspect, the first UCI, the second UCI, and the third UCI may be the same. For example, the second/third UCI may be a repeat/retransmission of the first UCI. In accordance with another aspect, the first UCI, the second UCI, and the third UCI may be different.

With the same hopping pattern, in the other sPUCCH configuration 450 (e.g., sPUCCH configured in second slot (slot 1) of the subframe), the first set of 2 symbols (412) of the sPUCCH are associated with the first frequency subband (subband 1), the next set of 2 symbols (414) of the sPUCCH are associated with the second frequency subband (subband 2), and the last set of 3 symbols (416) of the sPUCCH are again in the first frequency subband (subband 1). In the sPUCCH configuration 450, the resources corresponding to the first symbol of the set of symbols 412 in subband 1 may carry uplink control data while the resources in the second symbol of set 412 in subband 1 may carry DM-RS. The resources corresponding to the first symbol of the set of symbols 414 in subband 2 may carry uplink control data while the resources of the second symbol of the set of symbols 414 may carry DM-RS. Finally, the resources corresponding to the first and third symbols of the set of symbols 416 in subband 1 may carry uplink control data while the resources of the middle symbol of the set 416 in subband 1 may carry DM-RS.

Figure 5:
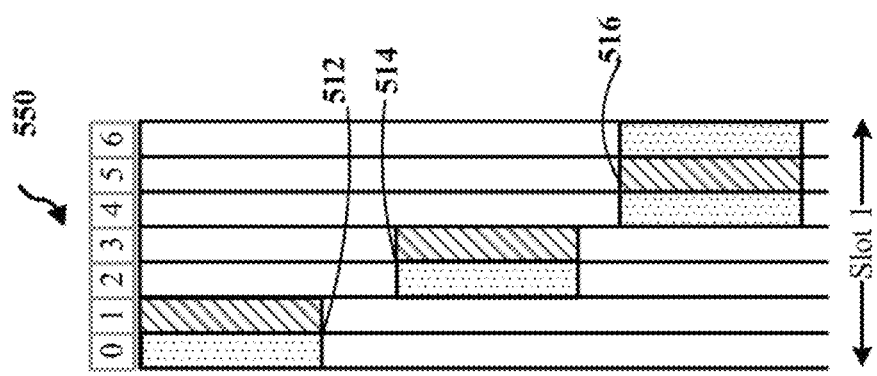
FIG. 5 illustrates another set of single slot sPUCCH configurations and a second intra-sTTI frequency hopping pattern used therewith.
Figure 5:
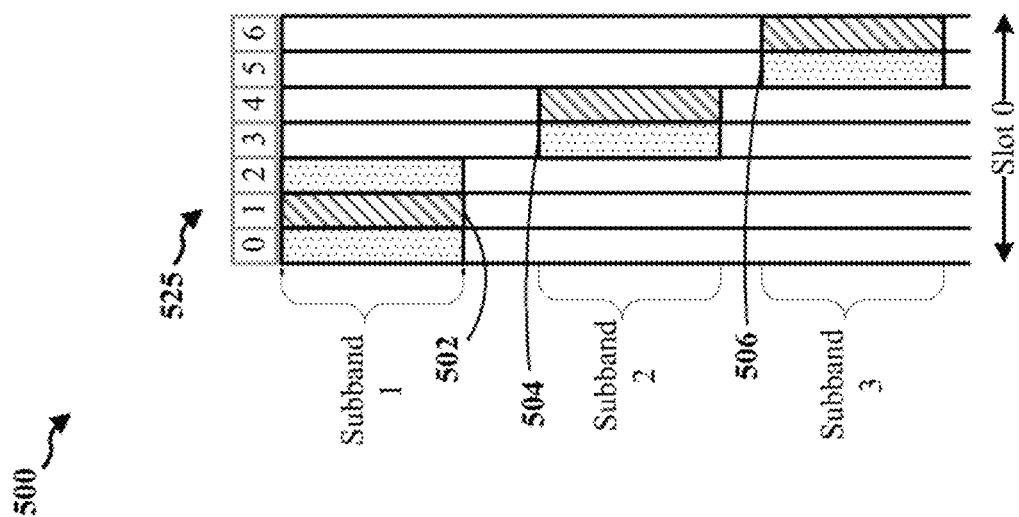

In some other configurations, an alternative intra slot frequency hopping pattern as illustrated in FIG. 5 may be used where each part (set of symbols) of a single slot sPUCCH may occupy a different subband. FIG. 5 is a drawing 500 illustrating two configurations of a single slot sPUCCH and another intra-sTTI frequency hopping pattern used therewith. Drawing 500 illustrates a first configuration 525 of the single slot sPUCCH when the sPUCCH is in a first slot of a subframe and a second configuration 550 of the single slot sPUCCH when the sPUCCH is in a second slot of the subframe. In the same manner as discussed above, the frequency hopping pattern of drawing 500 may be configured in accordance with uplink layout of the 2-symbol sTTI [3,2,2,2,2,3]. As illustrated, with the 2 hop per slot hopping pattern, in the sPUCCH configuration 525 (e.g., sPUCCH in slot 0) the first set of 3 symbols (502) corresponding to the sPUCCH are in the first frequency subband (subband 1), the next set of 2 symbols (504) corresponding to the sPUCCH are in the second frequency subband (subband 2), and the last set of 2 symbols (506) of the sPUCCH are in a third frequency subband (subband 3). In the first sPUCCH configuration 525, the resources corresponding to the first and third symbols of the set of symbols 502 in subband 1, may carry uplink control data (shown with a dotted pattern) while the resources of the second symbol of the set of symbols 402 may carry DM-RS (diagonal line pattern. The resources corresponding to the first symbol of the next set of 2 symbols 504 in subband 2, may carry uplink control data while the resources of the second symbol of the set of symbols 504 may carry DM-RS. The resources corresponding to the first symbol of the set of 2 symbols 506 in subband 3 may carry uplink control data while the resources of the second symbol of the set of symbols 506 in subband 3 may carry DM-RS.

With the same hopping pattern, in the other sPUCCH configuration 550 (e.g., sPUCCH configured in slot 1), the first 2 symbols (512) corresponding to the sPUCCH are in the first frequency subband (subband 1), the next 2 symbols (514) corresponding to the sPUCCH are in the second frequency subband (subband 2), and the last set of 3 symbols (516) of the sPUCCH are in the third frequency subband (subband 3). In the sPUCCH configuration 550, the resources corresponding to the first symbol of the set of symbols 512 in subband 1 may carry uplink control data while the resources in the second symbol of set 512 in subband 1 may carry DM-RS. The resources corresponding to the first symbol of the set of symbols 514 in subband 2 may carry uplink control data while the resources of the second symbol of the set of symbols 514 may carry DM-RS. The resources corresponding to the first and third symbols of the set of symbols 516 in subband 3, may carry uplink control data while the resources of the middle symbol of the set 516 in subband 3 may carry DM-RS.

In FIGS. 4 and 5, in terms of bandwidth, each of the illustrated frequency subbands (e.g., subband 1, subband 2, subband 3) may correspond to a single RB, or may include less/more than one RB. The information carried by the resources of the different sets of symbols in an sPUCCH may depend on the sPUCCH format. For example, some symbols may carry uplink control information while others may carry reference signal, e.g., DM-RS, as discussed above.

In accordance with an aspect, regardless of whether or not frequency hopping is adopted, for a given uplink control information (UCI) payload size, different structures and resources may be defined for the single slot sPUCCH. For example, each structure may have different number of RBs, different number of DM-RSs, different DM-RS positions, different orthogonal cover code (OCC) length, etc. Based on the condition of a UE and/or the UCI payload size, the most suitable structure may be selected for communicating the UCI. Even for a given sPUCCH format and a fixed payload size, a plurality of different structures may be defined for different UE conditions (e.g., channel conditions). In certain aspects, each SPUCCH structure may be designed to support a certain payload size, or alternatively to support up to a maximum payload size. Configuring sPUCCH having various different structures and resources ensures that, e.g., the right structure/resource(s) is chosen for each UE according to the UE's condition, and that different multiplexing capacities can be achieved, e.g., to multiplex multiple UEs on a sPUCCH. The set of possible structures/resources may be indicated to each UE via a higher layer signaling, e.g., such as via a RRC message or in a SIB. In some configurations, the information regarding different possible structures and resources may be preconfigured at the UEs, and the base station may signal an indication of which one of the different possible structures and resources is to be used by a UE. In some configurations, the indication of a structure/resource to be used by a UE for sPUCCH may be via RRC signaling from the base station. In one configurations, the indication of the assignment of a structure/resource to be used by a UE may be either an explicit indication (e.g., a bit field in the downlink control information (DCI)), or an implicit indication, e.g., similar to a ACK/NACK resource indicator (ARI) mechanism. For example, in some configurations, a bit field in the DCI may indicate which set of structure/resources is assigned to the given UE for use. For example, a 2-bit field in the DCI can indicate one of the: (structure1, resource1), (structure1, resource2), (structure2, resource3), (structure2, resource4) etc. From the perspective of a UE, a structure may indicate, for example, how many RBs are to be used for the sPUCCH, how many DM-RSs can be in the sPUCCH and their positions (locations), e.g., the position/location of DM-RS symbols in the slot of sPUCCH, the OCC length across symbols in same/different subbands etc. Thus, each structure of a sPUCCH may support a certain maximum payload size and may be associated with a particular number of RBs, a particular number of DM-RSs, positions/locations of DM-RS within a slot, and OCC length. In some configurations, a comb structure across one or more symbols of the sPUCCH may be used. A number of combs per symbol may also defined and indicated as part of a structure. For example, different structures may be associated with different number of combs per symbol. The number of combs may be different across different symbols corresponding to a sPUCCH.

Figure 6:
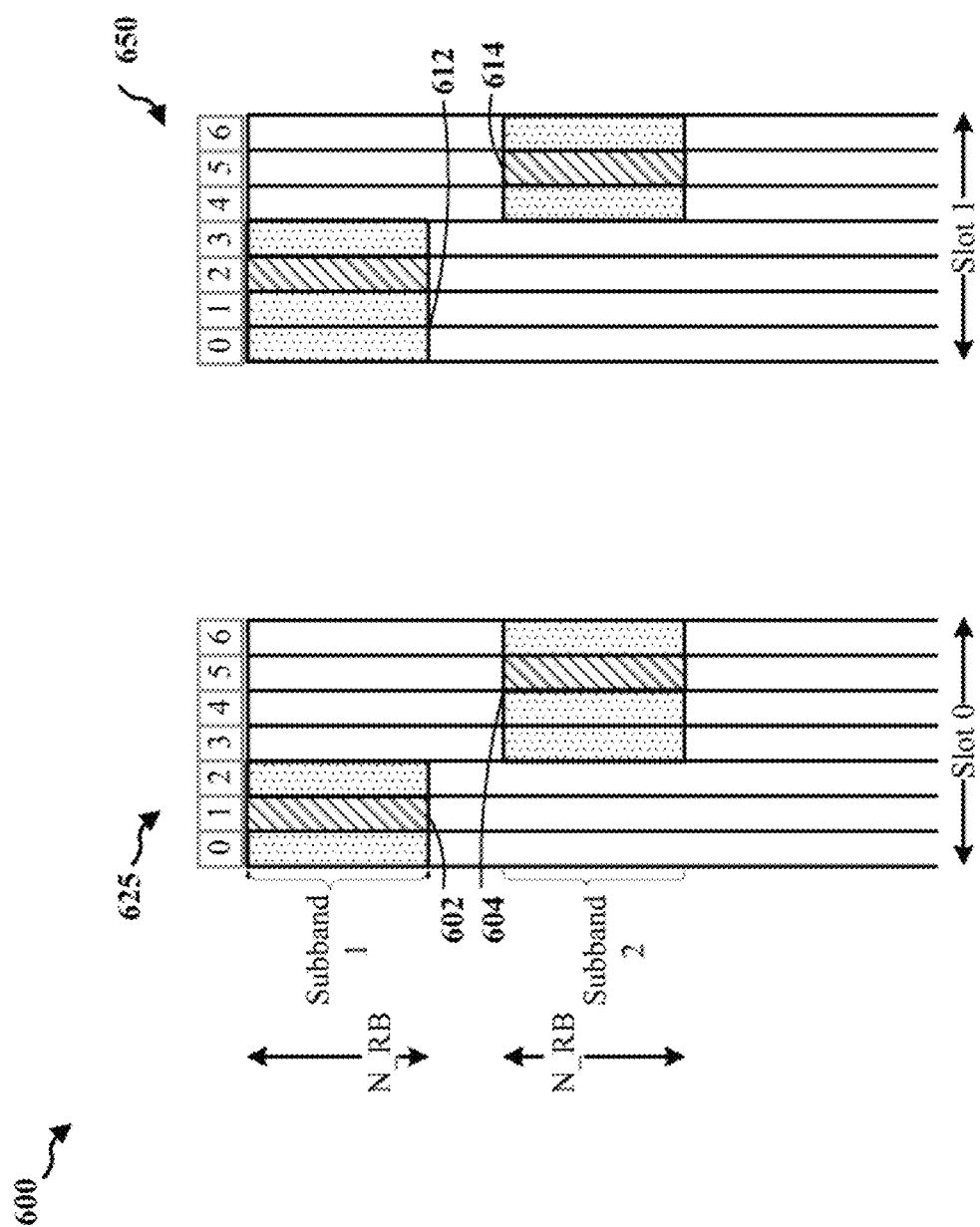
FIG. 6 illustrates another two configurations of a single slot sPUCCH and a single hop intra-sTTI frequency hopping pattern used therewith.

In some configurations, the single slot sPUCCH design may be based in part on, and/or compatible with, PUCCH format 2 or 3, e.g., in a sense that in some sPUCCH configurations, each slot may have 2 DM-RS symbols similar to format 2/3. One such single slot sPUCCH format is shown in FIG. 6, however in the illustrated configurations intra-sTTI frequency hopping is adopted unlike the legacy PUCCH formats. FIG. 6 is a drawing 600 illustrating two configurations of a single slot sPUCCH and an intra-sTTI frequency hopping pattern used therewith. Drawing 600 shows a first configuration 625 of the single slot sPUCCH when the sPUCCH is in a first slot (slot 0) of a subframe and a second configuration 650 of the single slot sPUCCH when the sPUCCH is in a second slot (slot 1) of the subframe. Furthermore, as can be appreciated, the frequency hopping pattern of drawing 600 allows one hop per slot. The sPUCCH configurations with frequency hopping illustrated in FIG. 6 may be also be in accordance with uplink layout of the 2-symbol sTTI [3,2,2,2,2,3]. As illustrated, with the single hop per slot hopping pattern, in the sPUCCH configuration 625 (e.g., sPUCCH in slot 0), the first set of 3 symbols (602) corresponding to the sPUCCH are associated with a first frequency subband (subband 1) and the next 4 symbols (604) corresponding to the sPUCCH are associated with a second frequency subband (subband 2). In the first sPUCCH configuration 625, the resources corresponding to the first and third symbols, of the set of 3 symbols 602, may carry uplink control data (e.g., first UCI) while the REs corresponding to the second symbol of the set of 3 symbols 602 may carry DM-RS. Similarly, the resources corresponding to the first, second and fourth symbols of the set of 4 symbols 604 may carry uplink control data (e.g., second UCI) while the resources of the third symbol of the set of 4 symbols 604 may carry DM-RS.

In the other sPUCCH configuration 650 (e.g., sPUCCH configured in slot 1 of the subframe) that uses the same single hop per slot hopping pattern, the first set of symbols includes 4 symbols (612) and the second set includes 3 symbols (e.g., 4+3 symbol layout as the sPUCCH is in the second slot of the subframe). The first set of symbols 612 corresponding to the sPUCCH is associated with the first frequency subband (subband 1) and the next set of 3 symbols (614) corresponding to the sPUCCH is associated with the second frequency subband (subband 2). In the sPUCCH configuration 650, the resources corresponding to the first, second and fourth symbols of the set of symbols 612 may carry uplink control data while the REs of the third symbol may carry DM-RS. The resources corresponding to the first and third symbols, of the set of symbols 614, may carry uplink control data while the resources of the second symbol of the set 614 may carry DM-RS. In terms of bandwidth, each of the illustrated frequency subbands (e.g., subband 1, subband 2) may include a single RB or may include less/more than one RB. Thus, N_RB (number of RBs) indicated in the figure may include one RB or less/more than one RB. From a comparison of the two configurations, it may be appreciated that the structure of the single slot sPUCCH in configuration 625 is different than the structure of the single slot sPUCCH in configuration 650, e.g., in terms of the position/location of the DM-RS. While it may not be apparent from the drawing, the structures may also differ in terms of number of combs per symbol, symbols over which OCC is used, the OCC length across the symbols, etc.

It may be appreciated from a comparison of the two sPUCCH configurations illustrated in FIG. 6 that a given sPUCCH configuration (e.g., layout) may be based on slot index of the subframe. For example, with intra slot frequency hopping enabled, when the sPUCCH is in the first slot (slot 0) of a subframe as in the first configuration 625, the sPUCCH layout may be of the form of 3+4 symbols. However, when the sPUCCH is in the second slot (slot 1) of the subframe as in the second configuration 650, the sPUCCH layout may be of the form of 4+3 symbols.

Figure 7:
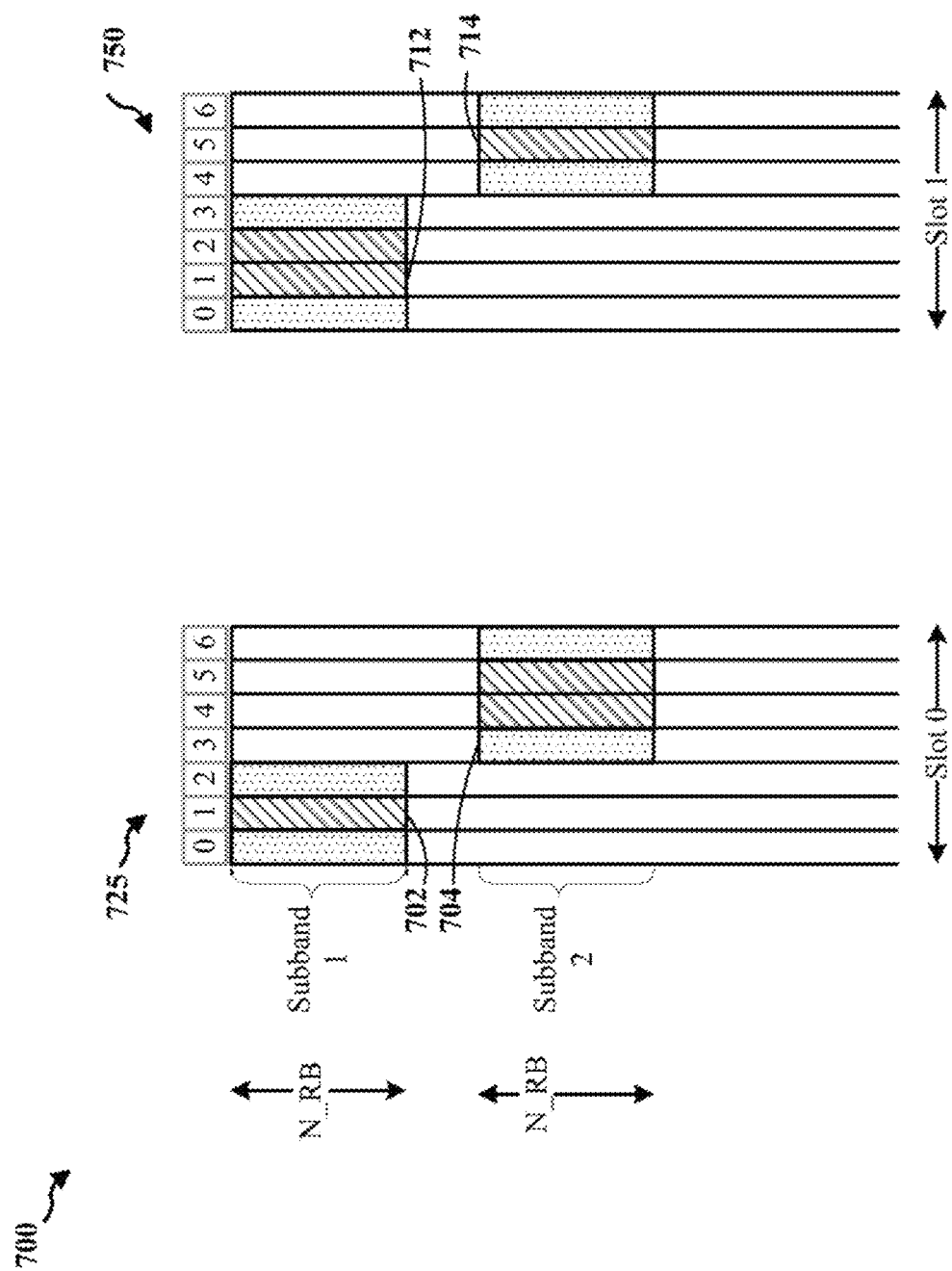
FIG. 7 illustrates yet another two configurations of a single slot sPUCCH where a single hop intra-sTTI frequency hopping pattern is used.

FIG. 7 illustrates a drawing 700 showing another set of configurations of a single slot sPUCCH that may be used by a UE (e.g., UE 104) for communicating UCI. While the same one hop per slot frequency hopping pattern as shown in FIG. 6 may be used in the sPUCCH configurations 725 and 750, the structure and/or format of the single slot sPUCCH in the configurations shown in FIG. 7 is different from the ones shown in FIG. 6. As illustrated, with the 1 hop per slot hopping pattern, in the sPUCCH configuration 725 (e.g., sPUCCH in slot 0 of a subframe) the resources corresponding to the first and third symbols of the set of symbols 702 of the sPUCCH may carry uplink control data, e.g., first UCI (shown with dotted pattern) while the resources corresponding to the second symbol of the set of symbols 702 may carry DM-RS (shown with diagonal pattern). The resources corresponding to the first and fourth symbols of the set of symbols 704 (associated with subband 2) may carry uplink control data, e.g., second UCI, while the resources of the second and third symbols of the set of symbols 704 may carry DM-RS. In accordance with one aspect, the first UCI and the second UC may be the same. For example, the second UCI may be a repeat/retransmission of the first UCI. In another example, the first and second UCI may be different.

In the other sPUCCH configuration 750 (e.g., sPUCCH configured in slot 1 of the subframe), the resources corresponding to the first and fourth symbols of the set of symbols 712 (associated with subband 1) may carry uplink control data while the resources of the second and third symbols may carry DM-RS. Furthermore, the resources corresponding to the first and third symbols, of the set of symbols 714 (associated with subband 2), may carry uplink control data while the resources of the second symbol of the set 714 may carry DM-RS. Furthermore, in accordance with one aspect, there may be OCC across data symbols of the sPUCCH in the same band.

As discussed earlier, in certain aspects, for a given sPUCCH format and a fixed payload size, there may be a plurality of different structures. For example, in one aspect, there may be two different sPUCCH structures (e.g., a first structure and a second structure) for a given sPUCCH format and given payload size. In one such aspect, the first structure may be defined with no intra-slot frequency hopping and with OCC, while the second structure may be defined with intra-slot frequency hopping and with no OCC. Thus, a single slot sPUCCH having such a first structure may have OCC applied across the symbols in the slot, and a single slot sPUCCH having such a second structure may have no OCC across the symbols in the slot.

In various configurations, depending on the format of the single slot sPUCCH, different symbols of the sPUCCH may carry uplink control data and reference signals. In some configurations, the format and/or structure to be used for the sPUCCH may be indicated via RRC signaling from the base station (e.g., base station 102/180) or such indication may be received in the downlink control information from the base station. Furthermore, based on the format of the sPUCCH, uplink data carried by a data symbol of the sPUCCH may be repeated in a subsequent data symbol. From FIGS. 4-7, it may be appreciated that various design configurations and structures of a single slot sPUCCH are possible. As discussed above, the structure and resources for an sPUCCH may be configured based on the UE condition and/or given payload size of the uplink control information to be transmitted.

In some configurations, there may be OCC across data symbols in the same subband, and/or DM-RS symbols within the same subband. For example, OCC of length 2 across the 2 data symbols in the set of symbols 602 in the same subband (subband 1) may be utilized for more protection against interference and noise. Similarly, in the configuration 725 shown in FIG. 7, OCC of length 2 across the 2 data symbols in the set of symbols 702 in the same subband (subband 1) may be used and OCC of length 2 across the 2 DM-RS symbols in the set 704 may be used. In some configurations, for small payload sizes, e.g., 1-2 bit ACK/NACK and/or a scheduling request (SR), the waveform generation may be the same or similar to the legacy PUCCH format 1a or 1b, e.g., modulated symbol may be mapped to the data symbol in the same or similar manner as in PUCCH format 1a or 1b. However, having the same waveform generation is not necessary and may be different than that used in legacy PUCCH formats.

In some configurations, a 1-slot sPUCCH may be based on legacy PUCCH format 3, and in such configurations there may be no OCC across symbols in different subbands, e.g., when intra-slot frequency hopping is adopted and UCI carried in the different sets of symbols is frequency hopped.

In accordance with another aspect, for large payload sizes, two approaches may be adopted with regard to the use of frequency hopping. In a first approach, no hopping is used for the sPUCCH formats carrying large payload sizes. For example, in some configurations where sPUCCH is designed based on PUCCH format 4 and 5, intra-sTTI frequency hopping is not used, e.g., when the UCI payload is large. This is owing to fact that when frequency hopping is adopted, a DM-RS symbol may be needed for each subband over which hopping occurs. This may be considered wasteful, more so in situations where the payload to be carried is already large, overhead is extensive and greater number of symbols are needed for carrying the data. In such cases, having to give up at least one symbol per subband (for DM-RS) may be considered wasteful enough to discourage use of frequency hopping.

In a second approach, frequency hopping is used even for sPUCCH carrying large payload sizes. For example, in some configurations for sPUCCH formats designed based on PUCCH format 2 and 3, hopping may be used. As discussed above, FIG. 6 illustrates an example of such a configuration of the sPUCCH where frequency hopping is utilized and the sPUCCH format may be based on PUCCH format 2 or 3, e.g., in terms of waveform generation and/or the number of DM-RS symbols per slot.

Figure 8:
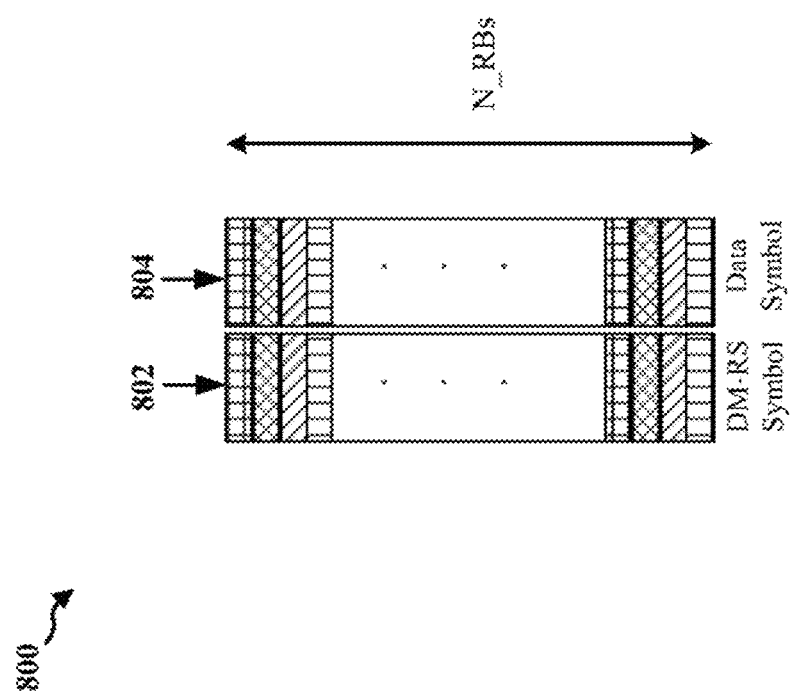
FIG. 8 illustrates an example of an interleaved frequency division multiple access (IFDMA) based 2-symbol sPUCCH.

FIG. 8 is a drawing 800 illustrating an IFDMA based 2-symbol sPUCCH. The 2-symbol sPUCCH includes a DM-RS symbol 802 and data symbol 804 which may extend to N RBs. In the 2-symbol sPUCCH, a comb structure is assumed over the DM-RS and data symbols. That is, over each symbol a comb structure of different combs may be used. For instance, in the illustrated example, the comb structure over each symbol may include four combs which repeat throughout the symbol, where each comb is represented in the figure using a different pattern. In some configurations, a first UE may be assigned a first comb and may transmit its DM-RS and/or data on the comb while another UE may get a different comb and transmit its DM-RS and/or data on the different comb to maintain orthogonality. In some other configuration, the UEs may be assigned the same combs but different cyclic shifts, or they may be assigned different combs in order for the UE transmissions to be orthogonal. While the number of combs across the two symbols shown in FIG. 8 is the same, e.g., 4, in accordance with an aspect, the number of combs may be different across symbols. For example, the number of combs from DM-RS symbol 802 to the data symbol 804 may be different. Similarly, the number of combs from a data symbol to another data symbol may be different, or from one DM-RS symbol to another DM-RS symbol may be different.

In some configurations, a sequence based transmission over a DM-RS symbol using combs may be performed. For example, in some configurations, different combs/cyclic shifts may be assigned to different users. In such configurations, rather than transmitting a DM-RS sequence on assigned consecutive subcarriers, a UE may transmit the DM-RS sequence on the assigned comb. The use of combs in addition to the cyclic shift provides another dimension of orthogonality and allows for better multiplexing of different users. Once a UE generates a DM-RS sequence, the sequence may be mapped to the comb assigned to the UE and then transmitted.

For data transmission, two approaches may be considered. In a first approach, sequence based data transmission over a data symbol using combs may be performed for small payload sizes, e.g., BPSK/QPSK symbols. For example, consider that each UE may be assigned 4 cyclic shifts and a comb and the UE has to transmit a 2-bit ACK/NACK. The UE may select a cyclic shift to use based on the data sequence to transmit, e.g., whether the UE has to transmit a 0001 or a 1011, and then use the assigned comb to transmit the data sequence. The base station may receive the transmission, detect the cyclic shift chosen by the UE for the transmission, and determine what combination of ACK/NACK was meant to be transmitted by the UE, e.g., ACK/NACK, ACK/ACK, NACK/ACK or other combination. In a second approach, for large payload sizes, a discrete Fourier transform (DFT) based transmission is used over the assigned combs. Thus, for a data stream to be transmitted, a DFT is generated and then rather than transmission over consecutive subcarriers the transmission occurs over the subcarriers corresponding to the assigned comb.

While the illustration in drawing 800 and the above discussion is for a 2-symbol sPUCCH, the same concept is extended in some configurations for a single slot multi-symbol sPUCCH, such as illustrated in FIGS. 4-7. Thus, in some configurations, a single slot sPUCCH with 7 symbols may be used with a comb structure over each of the symbols of the sPUCCH. The same data and DM-RS structures (or a variation of these) as discussed above with regard to the 2 symbol sPUCCH of FIG. 8 may be used to design a single slot sPUCCH. As part of the information regarding the different structures of the sPUCCH, the number of combs per symbol can also be indicated to the UE. Thus a UE may be able to determine how many combs per data and/or DM-RS symbols are there and which comb is assigned to the UE. As previously discussed, in some configurations, different number of combs may be used over different symbols as discussed above, e.g., number of combs used over one symbol may be different than a number of combs over another symbol of the sPUCCH.

Figure 9:
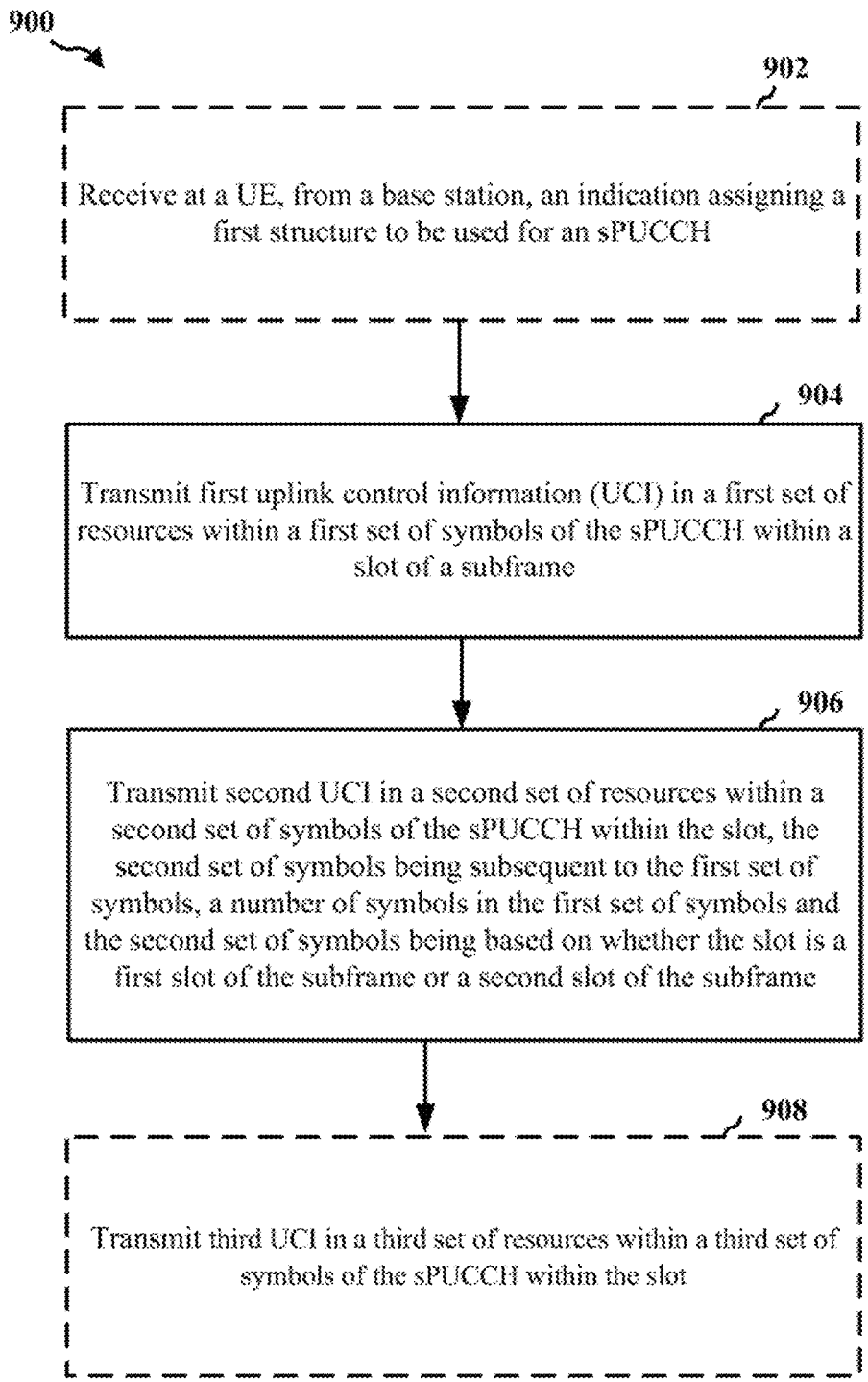
FIG. 9 is a flowchart of a method of wireless communication.

FIG. 9 is a flowchart 900 of a method of wireless communication. The method may be performed by an apparatus (e.g., such as the UE 104, 350, apparatus 1002, 1002'). Some of the operations may be optional as represented by dashed boxes and may be performed in some but not all embodiments. For the discussion below, the apparatus is simply referred to as the UE.

In one configuration, at 902 the UE may receive an indication from a base station (e.g., base station 102/180) assigning a first structure to the UE to be used for an sPUCCH, e.g., for transmitting UCI of a given payload size. The first structure may be one of a plurality of structures. As discussed supra, there may be various different structures for a given UCI payload size. In one aspect, for an sPUCCH of a given format (e.g., 1, 1a, 1b, 2, 3, 4), there may be a plurality of different structures. Each structure may be characterized by a number of RBs, number of DM-RSs, DM-RS locations, orthogonal cover code (OCC) length, etc. Based on the condition of a UE and/or the UCI payload size, the base station may select a most suitable structure of the sPUCCH with a given format for the UE for communicating the UCI. For example, in some configurations, a number of various different structures and sPUCCH formats may be known to the UE (e.g., preconfigured/stored in the UE or the base station may configure the UE with this information via signaling). While the UE may already know which sPUCCH format to use based on its UCI payload size (e.g., 1, 1a, 1b for up to two bits of UCI, 2/3 for more than 2 bits, 3 and 4 for even larger payload and so on), the UE may need an indication from the base station as to which structure (for the sPUCCH) to use as there may be more than one structure for the same payload size. Accordingly, in an aspect, the base station may signal the UE which one of the structures is to be used by the UE for an sPUCCH that may carry the UCI from the UE. Thus, at 902 the UE may receive such an indication from the base station regarding the structure to be used for a given UCI payload size. In some configurations, the indication of a structure to be used by a UE for the sPUCCH may be received via RRC signaling from the base station. In some configurations, the indication may be an explicit indication in the DCI, or an implicit indication (e.g., similar to the ARI mechanism).

At 904, the UE may transmit first UCI in a first set of resources within a first set of symbols of a sPUCCH within a slot of a subframe. For example, the sPUCCH may be a single slot sPUCCH such as the ones shown in FIGS. 4-7. For instance, the sPUCCH may be considered to be the single slot sPUCCH 625 (e.g., sPUCCH may be configured in slot 0 of a subframe). In this example, the first set of resources within the first set of symbols may be the resources, e.g., REs and/or subcarriers of the subband 1, corresponding to set of symbols 602. The first UCI transmitted in the first set of resources within the first set of symbols may include uplink control data carried in the first and third symbols of the set of symbols 602 while the second symbol of the set of symbols 602 may carry DM-RS. In accordance with the features of the disclosed methods, the sPUCCH may have the first structure that is indicated to be used in the signaling from the base station as discussed with respect to 902.

At 906 the UE may transmit second UCI in a second set of resources within a second set of symbols of the sPUCCH within the slot, where the second set of symbols may be subsequent to the first set of symbols. For example, with the sPUCCH configuration 625 of FIG. 6 as an example, the second set of resources within the second set of symbols of the sPUCCH may be the resources corresponding to set of symbols 604. In some configurations, a number of symbols in the first set of symbols and a number of symbols in the second set of symbols is based on the slot index of the slot within the subframe. That is, a number of symbols in the first set of symbols and a number of symbols in the second set of symbols of the single slot sPUCCH may be based on whether the slot (in which the sPUCCH is configured) is a first slot of the subframe or a second slot of the subframe. For example, with reference to FIG. 6, it may be seen that when the sPUCCH is configured in the first slot of a subframe (e.g., as in configuration 625) the number of symbols in the first set 602 is three and the number of symbols in the second set 604 is four (e.g., sPUCCH with 3+4 symbol layout). However, when the sPUCCH is configured in the second slot of a subframe (e.g., as in configuration 650) the number of symbols in the first set 612 of the sPUCCH 650 is four and the number of symbols in the second set of symbols 614 of the sPUCCH is three (e.g., sPUCCH with 4+3 symbol layout). In an aspect, the sPUCCH carrying the first and second UCI has the first structure that is different from a second structure of a second sPUCCH in a different slot, and the first and second structures may be different with respect to at least one of a number of resource blocks, a number of DM-RS, positions for the DM-RS, comb structure, or orthogonal cover code (OCC) length. For example, as discussed above with respect to the sPUCCH configurations shown in FIGS. 4-7, there may be a plurality of different sPUCCH structures for a given UCI payload size, and two structures may differ from each other in terms of one or more of the number of resource blocks, the number of DM-RS, position/location for the DM-RS within the slot of the sPUCCH, comb structure/number of combs per symbol in the sPUCCH, or OCC length, etc. Thus, even if the second sPUCCH carries the same size UCI payload but the second sPUCCH is transmitted in a different slot of the subframe than the second sPUCCH may have a different structure than the sPUCCH. For example with reference to FIG. 7, for the same UCI payload size, there may be two different structures for an sPUCCH. The sPUCCH 725 that occupies a first slot (slot 0) of a subframe has a structure that is different than the structure of sPUCCH 750 that occupies a different slot, i.e., the second slot (slot 1) of the subframe (e.g., in terms of position/location of DM-RS).

In accordance with an aspect of some configurations, in addition to being based on the slot index, the number of symbols in the first set of symbols and the number of symbols in the second set of symbols may be further based on whether an intra-slot frequency hopping is used with the sPUCCH. In some configurations, where frequency hopping adopted, the number of symbols in the first set of symbols and the number of symbols in the second set of symbols in the sPUCCH may depend on a number of frequency hops within the slot. For example, as discussed with regard to FIGS. 4-7, the number of symbols corresponding to different parts of the sPUCCH may be different when a single hop (one hop per slot) frequency hopping is used (e.g., as illustrated in FIGS. 6-7) than when a double hop (two hops per slot) frequency hopping is used (e.g., as illustrated in FIGS. 4-5). For example, in some configurations, the first set of symbols may include three symbols and the second set of symbols may include four symbols when the slot (occupied by the sPUCCH) is the first slot of the subframe and a single hop per slot intra-slot frequency hopping is used (e.g., as in example sPUCCH configurations 625 and 725). In one such configuration a first symbol and a third symbol of the first set of three symbols of the sPUCCH may carry the first UCI while a second symbol of the first set of three symbols may carry DM-RS. Furthermore, a first and fourth symbol of the second set of four symbols of the sPUCCH may carry the second UCI while a second symbol and a third symbol of the second set of four symbols may each carry DM-RS. For example, with reference to sPUCCH 725 of FIG. 7), it may be appreciated that the first and third symbols of the set three symbols 702 carry UCI while the second symbol carries DM-RS, and the first and fourth symbols of the set of 4 symbols 704 carry UCI while the second and third symbols of the set 704 carry DM-RS. In another case the first set of symbols of the sPUCCH may include four symbols and the second set of symbols may include three symbols when the slot (occupied by the sPUCCH) is the second slot of the subframe and the single hop per slot intra-slot frequency hopping is used (e.g., as in example sPUCCH configurations 650 and 750). In one such configuration (e.g., as in example sPUCCH 750) a first symbol and a fourth symbol of the first set of four symbols of the sPUCCH may carry the first UCI while a second symbol and a third symbol of the first set of four symbols may each carry DM-RS. Furthermore, a first and third symbol of the second set of three symbols of the sPUCCH may carry the second UCI while a second symbol of the second set of three symbols may carry DM-RS.

In another example, the first set of symbols may include three symbols and the second set of symbols may include two symbols when the slot (occupied by the sPUCCH) is the first slot of the subframe and a double hop per slot intra-slot frequency hopping is used (e.g., as in example sPUCCH configurations 425 and 525), whereas the first set of symbols and the second set of symbols may each include two symbols when the slot is the second slot of the subframe and the double hop per slot intra-slot frequency hopping is used (e.g., as in example sPUCCH configurations 450 and 550). In some such configurations (e.g., frequency hopping enabled with 2 hops in the slot), the method of flowchart 900 may further include operation illustrated at 908 where the UE may transmit third UCI in a third set of resources within a third set of symbols of the sPUCCH within the slot. In such a configuration, the third set of symbols may be subsequent to the second set of symbols and may include two symbols when the slot is the first slot of the subframe (e.g., as illustrated in configurations 425 and 525) and three symbols when the slot is the second slot of the subframe (e.g., as illustrated in configurations 450 and 550).

Figure 10:
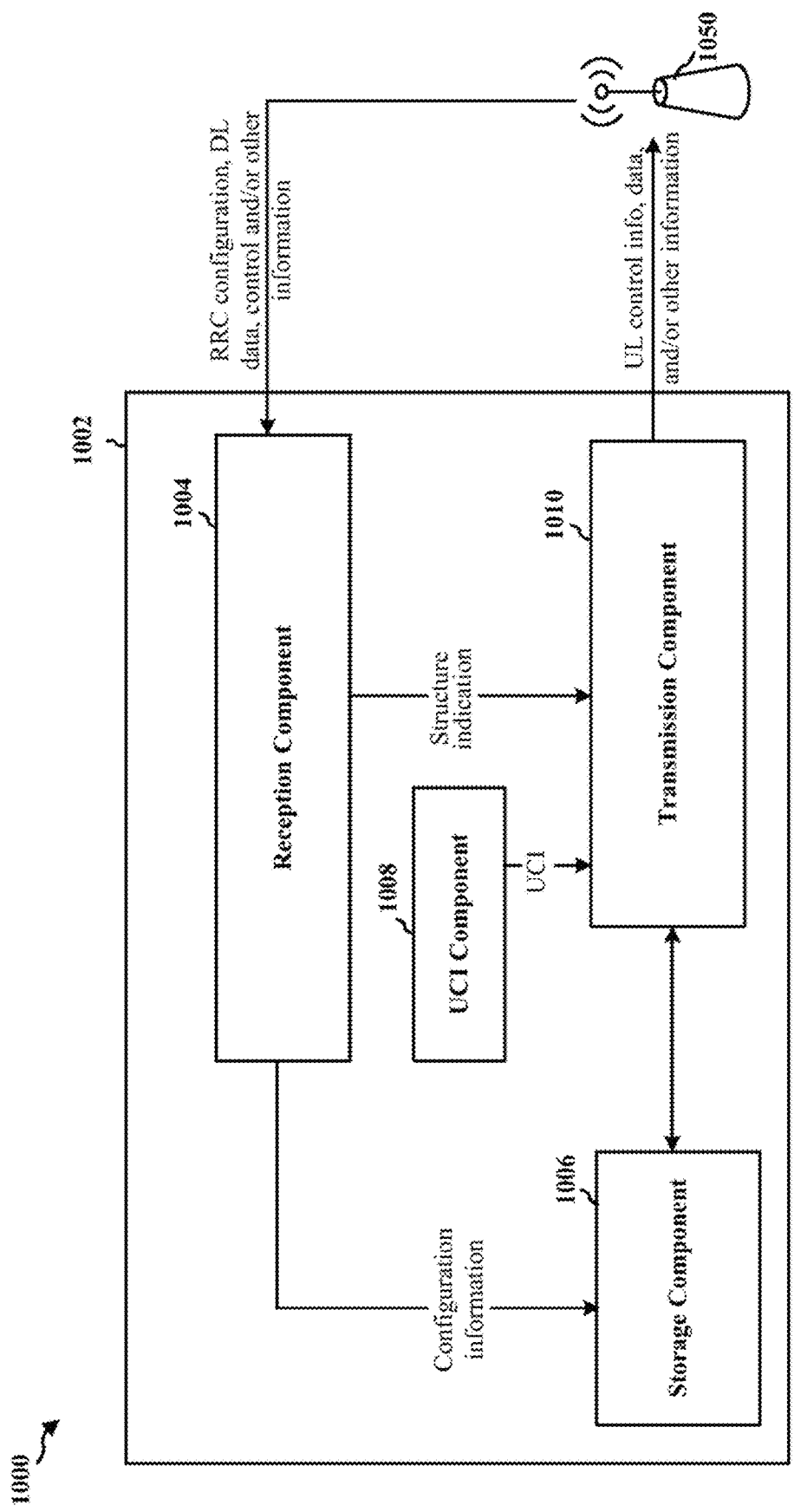
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus includes a reception component 1004, a storage component 1006, a UCI component 1008, and a transmission component 1010.

The reception component 1004 may be configured to receive RRC configuration, downlink control information, data, and/or other information from the base station 1050. The signals/information may be received by the reception component 1004 in accordance with the methods discussed supra including the method of flowchart 900. The received signals/information may be provided to one or more components of the apparatus 1002 for further processing and use in performing various operations in accordance with methods and techniques discussed supra. In various configurations, via the reception component 1004, the apparatus 1002 may receive configuration information (e.g., as RRC configuration) from the base station 1050. The configuration information may include information indicating various sPUCCH formats, various different possible sets of structures and resources that are defined and may be used for sPUCCH. As discussed supra, each structure may be associated with a particular number of RBs, a particular number of DM-RSs, positions/locations of DM-RS within a slot, and OCC length across data/DM-RS symbols in same/different subbands. The received configuration information may then be stored in the storage component (e.g., memory) 1006. In some other configurations, such information may be preconfigured in the apparatus 1002. Furthermore, in some configurations, the reception component 1004 may receive, from the base station 1050, an indication assigning a first structure to the apparatus to be used for an sPUCCH, e.g., for transmitting UCI of a given payload size from the apparatus 1002. The first structure may be one of the various different structures that may be known to the apparatus 1002 (e.g., preconfigured or based on the earlier RRC configuration from the base station). With the received indication, the apparatus 1002 determines which particular structure (for the sPUCCH) for the given UCI payload size is to be used as there may be a plurality of structures for the same payload size. In some configurations, the indication of the structure may be received via RRC signaling from the base station 1050, or the indication may be included in the DCI received from the base station via the reception component. In some configurations, the reception component 1004 may further receive an indication from the base station 1050 indicating whether intra slot frequency hopping is to be used in the sPUCCH for transmission of UCI.

In some configurations, reception component 1004 may provide the received indication of the structure to the transmission component 1010 for use in controlling the transmission of the sPUCCH in accordance with the indicated structure. The sPUCCH may carry the UCI generated by the UCI component 1006. The UCI may include information such as, for example, scheduling request, a CQI, a precoding matrix indicator, a rank indicator, and HARQ ACK/NACK feedback.

The transmission component 1010 may be configured to transmit uplink control information, data and/or other signaling to the base station 1050 in accordance with the features of the disclosed methods (e.g., flowchart 900), and techniques and configurations described supra in connection with FIGS. 4-8. In some configurations, the transmission component may transmit UCI in a single slot sPUCCH that may be configured in accordance with the indicated structure. For example, in some configurations, the transmission component 1010 may transmit first UCI in a first set of resources within a first set of symbols of a sPUCCH within a slot. The transmission component 1010 may be further configured to transmit second UCI in a second set of resources within a second set of symbols of the sPUCCH within the slot, where the second set of symbols is subsequent to the first set of symbols. In accordance with one aspect, a number of symbols in the first set of symbols and a number of symbols in the second set of symbols is based on whether the slot is a first slot of a subframe or a second slot of the subframe. For example, as discussed with regard to FIGS. 6-7, the number of symbols in the first set of symbols and the second set of symbols corresponding to the single slot sPUCCH may be based on whether the sPUCCH is configured in a first slot (slot 0) or the second slot (slot 1) of a subframe. The sPUCCH carrying the first and second UCI transmitted by the transmission component 1010 sPUCCH has the first structure (e.g., based on the indication from the base station 1050). In an aspect, the first structure associated with the sPUCCH is different from a second structure of a second sPUCCH in a different slot (e.g., an sPUCCH that occupies a different slot of the subframe). The first and second structures may differ with respect to at least one of a number of resource blocks, a number of DM-RS, positions/locations of the DM-RS, comb structure, or OCC length.

In certain configurations, the number of symbols in the first set of symbols and the number of symbols in the second set of symbols is further based on a number of frequency hops within the slot when an intra-slot frequency hopping is used with the sPUCCH, e.g., intra slot frequency hopping enabled for hopping the UCI across different bands. In some such configurations, the first set of symbols includes three symbols and the second set of symbols includes four symbols when the slot is the first slot of the subframe and a single hop per slot intra-slot frequency hopping is used. In some such configurations, the transmission component 1010 may be configured to transmit the first UCI in a first symbol and a third symbol of the first set of symbols of the sPUCCH and transmit DM-RS in a second symbol of the first set of symbols. The transmission component 1010 in such configurations may be further configured to transmit the second UCI in a first symbol and a fourth symbol of the second set of symbols of the sPUCCH and transmit DM-RS in a second symbol and a third symbol of the second set of symbols.

In certain other configurations where the slot (in which the sPUCCH is transmitted) is the second slot of the subframe and the single hop per slot intra-slot frequency hopping is used, the first set of symbols may include four symbols and the second set of symbols includes three symbols. In one such configuration, the transmission component 1010 may be further configured to transmit the first UCI in a first symbol and a fourth symbol of the first set of symbols of the sPUCCH, and transmit DM-RS in a second symbol and a third symbol of the first set of symbols. In such a configuration, the transmission component 1010 may be further configured to transmit the second UCI in a first symbol and a third symbol of the second set of symbols of the sPUCCH, and transmit DM-RS in a second symbol of the second set of symbols.

In some configurations, the first set of symbols includes three symbols and the second set of symbols includes two symbols when the slot is the first slot of the subframe and 2 hops per slot intra-slot frequency hopping is used. In certain other configurations, the first set of symbols and the second set of symbols each includes two symbols when the slot is the second slot of the subframe and 2 hops per slot intra-slot frequency hopping is used. In some such configurations, the transmission component 1010 may be further configured to transmit third UCI in a third set of resources within a third set of symbols of the sPUCCH within the slot. The third set of symbols may be subsequent to the second set of symbols and include two symbols when the slot is the first slot of the subframe (e.g., as illustrated in sPUCCH 425 and 525). However, when the slot is the second slot of the subframe, the second set of symbols may include three symbols (e.g., as illustrated in sPUCCH 450 and 550). In various configurations, the transmission component 1010 may transmit UCI and DM-RS in a sPUCCH in accordance with a selected format and assigned structure for the sPUCCH. In various configurations, the transmission component 1010 may transmit UCI in sPUCCH with various different configurations and designs such as those illustrated as examples in FIGS. 4-8.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
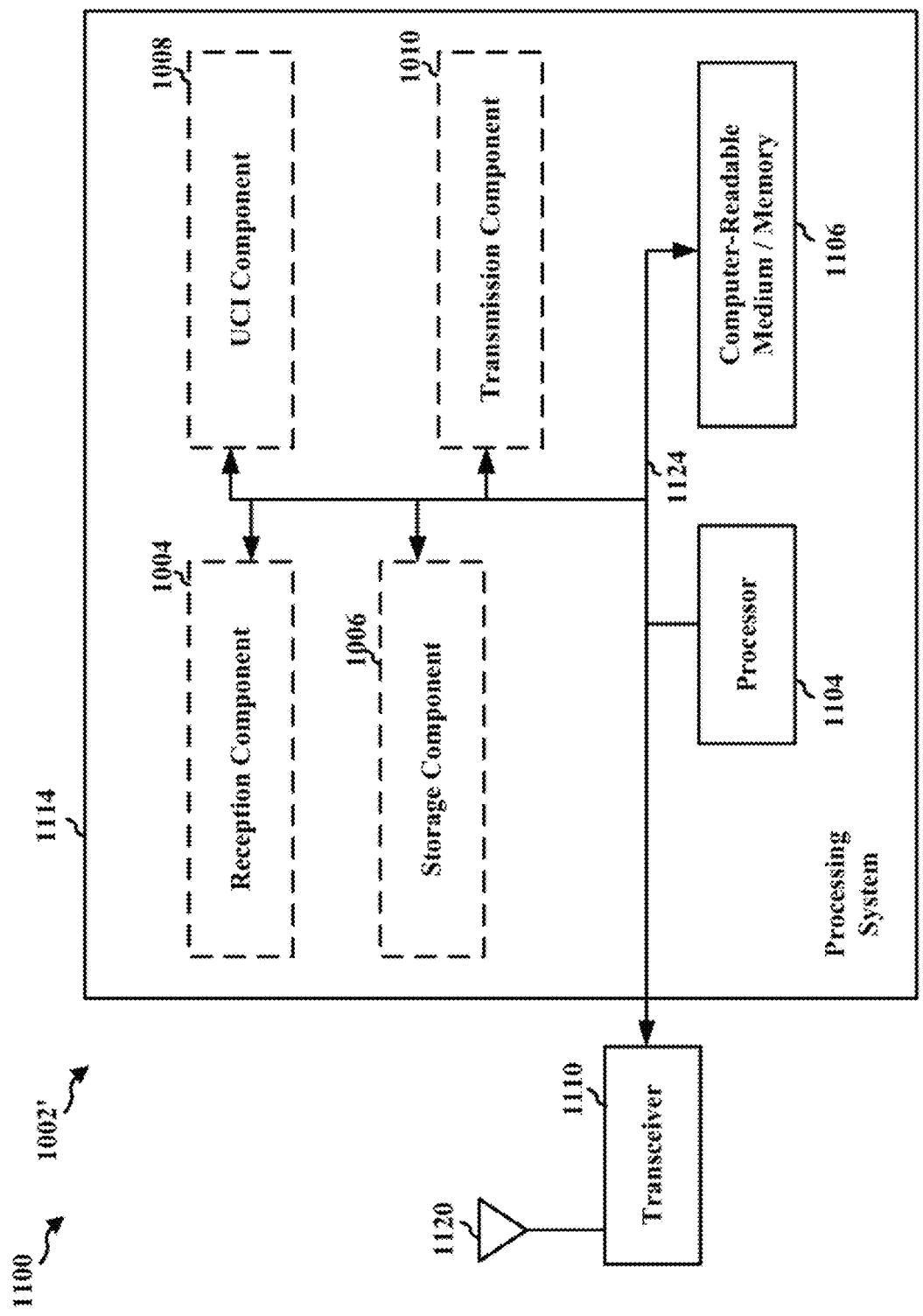
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. In some configurations, the storage component 1006 may be a part of the computer-readable medium/memory. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for transmitting first UCI in a first set of resources within a first set of symbols of a sPUCCH within a slot, and transmitting second UCI in a second set of resources within a second set of symbols of the sPUCCH within the slot, the second set of symbols being subsequent to the first set of symbols. In some configurations, the first set of symbols includes three symbols and the second set of symbols includes four symbols when the slot is the first slot of the subframe and a single hop per slot intra-slot frequency hopping is used. In some such configurations, the means for transmitting is configured to transmit the first UCI in a first symbol and a third symbol of the first set of symbols of the sPUCCH and a DM-RS in a second symbol of the first set of symbols carries DM-RS. Furthermore, in one configuration, the means for transmitting is further configured to transmit the second UCI in a first symbol and a fourth symbol of the second set of symbols of the sPUCCH and a DM-RS in each of a second symbol and a third symbol of the second set of symbols.

In some other configurations, the first set of symbols includes four symbols and the second set of symbols includes three symbols when the slot is the second slot of the subframe and the single hop per slot intra-slot frequency hopping is used. In some such configurations, the means for transmitting is configured to transmit the first UCI in a first symbol and a fourth symbol of the first set of symbols of the sPUCCH and a DM-RS in each of a second symbol and a third symbol of the first set of symbols. Furthermore, in one such configuration, the means for transmitting is further configured to transmit the second UCI in a first symbol and a third symbol of the second set of symbols of the sPUCCH and a DM-RS in a second symbol of the second set of symbols.

In some configurations, the means for transmitting is further configured to transmit third UCI in a third set of resources within a third set of symbols of the sPUCCH within the slot. In some such configurations, the third set of symbols is subsequent to the second set of symbols and includes two symbols when the slot is the first slot of the subframe. In some other configuration, the third set of symbols may include three symbols when the slot is the second slot of the subframe.

In some configurations, the sPUCCH may have a first structure that is different from a second structure of a second sPUCCH in a different slot, where the first and second structures being different with respect to at least one of a number of resource blocks, a number of DM-RS, positions for the DM-RS, comb structure, or OCC length. In some such configuration, the apparatus 1002/1002' may further include means for receiving, from a base station, an indication assigning the first structure to the apparatus to be used for the sPUCCH, where the first structure may be one of a plurality of structures.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In one configuration, an exemplary UE (e.g., UE 104/350/apparatus 1002') implementing the method of flowchart 900 may include a memory and at least one processor coupled to the memory. The at least one processor may be configured to: transmit first UCI in a first set of resources within a first set of symbols of a sPUCCH within a slot, and transmit second UCI in a second set of resources within a second set of symbols of the sPUCCH within the slot, the second set of symbols being subsequent to the first set of symbols. In some configurations, a number of symbols in the first set of symbols and a number of symbols in the second set of symbols is based on whether the slot is a first slot of a subframe or a second slot of the subframe. In one configuration, the UE may further include a communication interface including one or more antennas. In one such configuration, the at least one processor maybe further configured to transmit the sPUCCH including the UCI (e.g., first and second UCI) via the one or more antennas wirelessly over the air, and receive signaling from a base station (e.g., RRC message, DCI, etc. described supra) via the one or more antennas.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    transmitting first uplink control information (UCI) in a first set of resources within a first set of symbols of a shortened physical uplink control channel (sPUCCH) within a slot; and
    transmitting second UCI in a second set of resources within a second set of symbols of the sPUCCH within the slot, the second set of symbols being subsequent to the first set of symbols;
    wherein a number of symbols in the first set of symbols and a number of symbols in the second set of symbols is based on whether the slot is a first slot of a subframe or a second slot of the subframe,
    wherein the first set of symbols includes three symbols and the second set of symbols includes four symbols when the slot is the first slot and a single hop per slot intra-slot frequency hopping is used, and
    wherein the first set of symbols includes four symbols and the second set of symbols includes three symbols when the slot is the second slot of the subframe and the single hop per slot intra-slot frequency hopping is used.

2. The method of claim 1, wherein the sPUCCH has a first structure that is different from a second structure of a second sPUCCH in a different slot, the first and second structures being different with respect to at least one of a number of resource blocks, a number of demodulation reference signals (DM-RS), positions for the DM-RS, comb structure, or orthogonal cover code (OCC) length.

3. The method of claim 1, wherein the number of symbols in the first set of symbols and the number of symbols in the second set of symbols is further based on a number of frequency hops within the slot when an intra-slot frequency hopping is used with the sPUCCH.

4. The method of claim 1,
    wherein, when the slot is the first slot of the subframe, a first symbol and a third symbol of the first set of symbols of the sPUCCH carries the first UCI while a second symbol of the first set of symbols carries DM-RS, and wherein a first symbol and a fourth symbol of the second set of symbols of the sPUCCH carries the second UCI while a second symbol and a third symbol of the second set of symbols each carries DM-RS.

5. The method of claim 1,
wherein, when the slot is the second slot of the subframe, a first symbol and a fourth symbol of the first set of symbols of the sPUCCH carries the first UCI while a second symbol and a third symbol of the first set of symbols each carries DM-RS, and wherein a first symbol and a third symbol of the second set of symbols of the sPUCCH carries the second UCI while a second symbol of the second set of symbols carries DM-RS.

6. The method of claim 3, wherein the first set of symbols includes three symbols and the second set of symbols includes two symbols when the slot is the first slot of the subframe and a double hop per slot intra-slot frequency hopping is used; and
wherein the first set of symbols and the second set of symbols each includes two symbols when the slot is the second slot of the subframe and the double hop per slot intra-slot frequency hopping is used.

7. The method of claim 6, further comprises:
transmitting third UCI in a third set of resources within a third set of symbols of the sPUCCH within the slot, the third set of symbols being subsequent to the second set of symbols and including two symbols when the slot is the first slot of the subframe and including three symbols when the slot is the second slot of the subframe.

8. The method of claim 2, further comprising:
receiving, from a base station, an indication assigning the first structure to the UE to be used for the sPUCCH, the first structure being one of a plurality of structures.

9. The method of claim 8, wherein the indication is received in a radio resource control (RRC) message from the base station, or in a bit field of downlink control information received from the base station.

10. An apparatus for wireless communication, comprising:
a memory; and
at least one processor coupled to the memory and configured to:
transmit first uplink control information (UCI) in a first set of resources within a first set of symbols of a shortened physical uplink control channel (sPUCCH) within a slot; and
transmit second UCI in a second set of resources within a second set of symbols of the sPUCCH within the slot, the second set of symbols being subsequent to the first set of symbols;
wherein a number of symbols in the first set of symbols and a number of symbols in the second set of symbols is based on whether the slot is a first slot of a subframe or a second slot of the subframe,
wherein the first set of symbols includes three symbols and the second set of symbols includes four symbols when the slot is the first slot and a single hop per slot intra-slot frequency hopping is used, and
wherein the first set of symbols includes four symbols and the second set of symbols includes three symbols when the slot is the second slot of the subframe and the single hop per slot intra-slot frequency hopping is used.

11. The apparatus of claim 10, wherein the sPUCCH has a first structure that is different from a second structure of a second sPUCCH in a different slot, the first and second structures being different with respect to at least one of a number of resource blocks, a number of demodulation reference signals (DM-RS), positions for the DM-RS, comb structure, or orthogonal cover code (OCC) length.

12. The apparatus of claim 10, wherein the number of symbols in the first set of symbols and the number of symbols in the second set of symbols is further based on a number of frequency hops within the slot when an intra-slot frequency hopping is used with the sPUCCH.

13. The apparatus of claim 12, wherein, when the slot is the first slot of the subframe,
the at least one processor is configured to transmit the first UCI in a first symbol and a third symbol of the first set of symbols of the sPUCCH and transmit a DM-RS in a second symbol of the first set of symbols carries DM-RS, and wherein the at least one processor is further configured to transmit the second UCI in a first symbol and a fourth symbol of the second set of symbols of the sPUCCH and transmit a DM-RS in each of a second symbol and a third symbol of the second set of symbols.

14. The apparatus of claim 13, wherein, when the slot is the second slot of the subframe
the at least one processor is configured to transmit the first UCI in a first symbol and a fourth symbol of the first set of symbols of the sPUCCH and transmit a DM-RS in each of a second symbol and a third symbol of the first set of symbols, and wherein the at least one processor is further configured to transmit the second UCI in a first symbol and a third symbol of the second set of symbols of the sPUCCH and transmit a DM-RS in a second symbol of the second set of symbols.

15. The apparatus of claim 12, wherein the first set of symbols includes three symbols and the second set of symbols includes two symbols when the slot is the first slot of the subframe and a double hop per slot intra-slot frequency hopping is used; and
wherein the first set of symbols and the second set of symbols each includes two symbols when the slot is the second slot of the subframe and the double hop per slot intra-slot frequency hopping is used.

16. The apparatus of claim 15, wherein the at least one processor is further configured to:
transmit third UCI in a third set of resources within a third set of symbols of the sPUCCH within the slot, wherein the third set of symbols is subsequent to the second set of symbols and includes two symbols when the slot is the first slot of the subframe and includes three symbols when the slot is the second slot of the subframe.

17. The apparatus of claim 11, wherein the at least one processor is further configured to:
receive, from a base station, an indication assigning the first structure to the apparatus to be used for the sPUCCH, the first structure being one of a plurality of structures.

18. The apparatus of claim 17, wherein the indication is received in a radio resource control (RRC) message from the base station, or in a bit field of downlink control information received from the base station.

19. The apparatus of claim 18, further comprising a communication interface including one or more antennas, wherein the at least one processor is further configured to receive the RRC message or the downlink control information from the base station via the one or more antennas.

20. An apparatus for wireless communication, comprising:
means for storing; and
means for transmitting first uplink control information (UCI) in a first set of resources within a first set of symbols of a shortened physical uplink control channel (sPUCCH) within a slot, and transmitting second UCI in a second set of resources within a second set of symbols of the sPUCCH within the slot, the second set of symbols being subsequent to the first set of symbols;
wherein a number of symbols in the first set of symbols and a number of symbols in the second set of symbols is based on whether the slot is a first slot of a subframe or a second slot of the subframe,
wherein the first set of symbols includes three symbols and the second set of symbols includes four symbols when the slot is the first slot and a single hop per slot intra-slot frequency hopping is used, and
wherein the first set of symbols includes four symbols and the second set of symbols includes three symbols when the slot is the second slot of the subframe and the single hop per slot intra-slot frequency hopping is used.

21. The apparatus of claim 20, wherein the sPUCCH has a first structure that is different from a second structure of a second sPUCCH in a different slot, the first and second structures being different with respect to at least one of a number of resource blocks, a number of demodulation reference signals (DM-RS), positions for the DM-RS, comb structure, or orthogonal cover code (OCC) length.

22. The apparatus of claim 20, wherein the number of symbols in the first set of symbols and the number of symbols in the second set of symbols is further based on a number of frequency hops within the slot when an intra-slot frequency hopping is used with the sPUCCH.

23. The apparatus of claim 22, wherein, when the slot is the first slot of the subframe,
the means for transmitting is configured to transmit the first UCI in a first symbol and a third symbol of the first set of symbols of the sPUCCH and a DM-RS in a second symbol of the first set of symbols carries DM-RS, and wherein the means for transmitting is further configured to transmit the second UCI in a first symbol and a fourth symbol of the second set of symbols of the sPUCCH and a DM-RS in each of a second symbol and a third symbol of the second set of symbols.

24. The apparatus of claim 23, wherein, when the slot is the second slot of the subframe,
the means for transmitting is configured to transmit the first UCI in a first symbol and a fourth symbol of the first set of symbols of the sPUCCH and a DM-RS in each of a second symbol and a third symbol of the first set of symbols, and wherein the means for transmitting is further configured to transmit the second UCI in a first symbol and a third symbol of the second set of symbols of the sPUCCH and a DM-RS in a second symbol of the second set of symbols.

25. The apparatus of claim 22, wherein the first set of symbols includes three symbols and the second set of symbols includes two symbols when the slot is the first slot of the subframe and a double hop per slot intra-slot frequency hopping is used; and
wherein the first set of symbols and the second set of symbols each includes two symbols when the slot is the second slot of the subframe and the double hop per slot intra-slot frequency hopping is used.

26. The apparatus of claim 25, wherein the means for transmitting is further configured to transmit third UCI in a third set of resources within a third set of symbols of the sPUCCH within the slot, wherein the third set of symbols is subsequent to the second set of symbols and includes two symbols when the slot is the first slot of the subframe and includes three symbols when the slot is the second slot of the subframe.

27. The apparatus of claim 21, further comprising:
means for receiving, from a base station, an indication assigning the first structure to the apparatus to be used for the sPUCCH, the first structure being one of a plurality of structures.

28. The apparatus of claim 27, wherein the indication is received in a radio resource control (RRC) message from the base station, or in a bit field of downlink control information received from the base station.

29. A computer-readable medium storing computer executable code, comprising code to:
transmit first uplink control information (UCI) in a first set of resources within a first set of symbols of a shortened physical uplink control channel (sPUCCH) within a slot; and
transmit second UCI in a second set of resources within a second set of symbols of the sPUCCH within the slot, the second set of symbols being subsequent to the first set of symbols;
wherein a number of symbols in the first set of symbols and a number of symbols in the second set of symbols is based on whether the slot is a first slot of a subframe or a second slot of the subframe,
wherein the first set of symbols includes three symbols and the second set of symbols includes four symbols when the slot is the first slot and a single hop per slot intra-slot frequency hopping is used, and
wherein the first set of symbols includes four symbols and the second set of symbols includes three symbols when the slot is the second slot of the subframe and the single hop per slot intra-slot frequency hopping is used.

* * * * *